Dec. 7, 1954 R. SERRELL 2,696,600
COMBINATORIAL INFORMATION-STORAGE NETWORK
Filed Nov. 30, 1950 2 Sheets-Sheet 1

INVENTOR
Robert Serrell
BY Morris A. Rabkin
ATTORNEY

Dec. 7, 1954 R. SERRELL 2,696,600

COMBINATORIAL INFORMATION-STORAGE NETWORK

Filed Nov. 30, 1950 2 Sheets-Sheet 2

INVENTOR
Robert Serrell
BY Morris L. Rabkin
ATTORNEY

United States Patent Office 2,696,600 Patented Dec. 7, 1954

2,696,600

COMBINATORIAL INFORMATION-STORAGE NETWORK

Robert Serrell, Princeton, N. J., assignor to Radio Corporation of America, a corporation of Delaware Application November 30, 1950, Serial No. 198,338

3 Claims. (Cl. 340—174)

Figure 1:
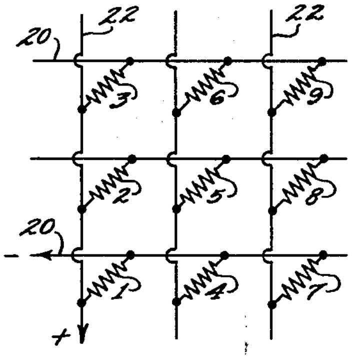

This invention relates to combinatorial storage networks. More particularly, this invention relates to memory systems such as are used in computers and other information-handling machines.

Information-handling machines, computing equipment and the like usually have, as part of their structure, a storage system or memory of some kind. Its function depends on the design of the machine. The design of the machine also determines whether information is stored permanently or for short periods of time prior to being removed from the memory. Whether the storage is long or short, it is usually desirable that information which is stored be readily accessible. Furthermore, it is also desirable to replace information in a register with new information with a minimum number of operations. Another desirable feature, where large amounts of information are stored, is that the procedure and apparatus required for writing into or reading out of the memory be as simple as possible. Presently existing storage devices such as magnetic tapes or delay lines do not permit random access. Storage tubes, while permitting random access, require power for holding and complex circuitry for control.

It is an object of the present invention to provide a combinatorial storage network which permits random access to information stored therein.

It is a further object of the present invention to provide a combinatorial storage network the control of which is extremely simple.

It is still a further object of the present invention to provide a combinatorial storage network having fewer access leads than storage elements.

Still another object of this present invention is to provide a combinatorial storage network requiring no holding power.

Yet another object of the present invention is to provide a combinatorial storage network which is simpler and less expensive than those known heretofore.

These and other objects are achieved in accordance with the present invention by providing a first and a second set of selecting conductors and a plurality of storage means each having two stable states and means to transfer from one to the other of the two stable states. Each of the transfer means has the same impedance, operates to transfer the storage means reversibly from one to the other of its stable states and does not operate in response to a current not exceeding one-half of the current which is applied to one of the first and one of the second set of selecting conductors. Each of the transfer means is connected between one of the first and one of the second sets of selecting conductors in a manner such that an equal number of transfer means is connected to each one of the first set of selecting conductors and each of the transfer means which is connected to a one of the first set of conductors is also connected to a different one of the second set of conductors. Selection of a storage means for reading or writing purposes is obtained by applying an exciting voltage to one of the first and one of the second set of selecting conductors between which the transfer means of the selected storage means is connected. Means are also provided to detect the condition of the selected storage means and to restore the storage means to that condition where the act of reading alters it.

Figure 5:
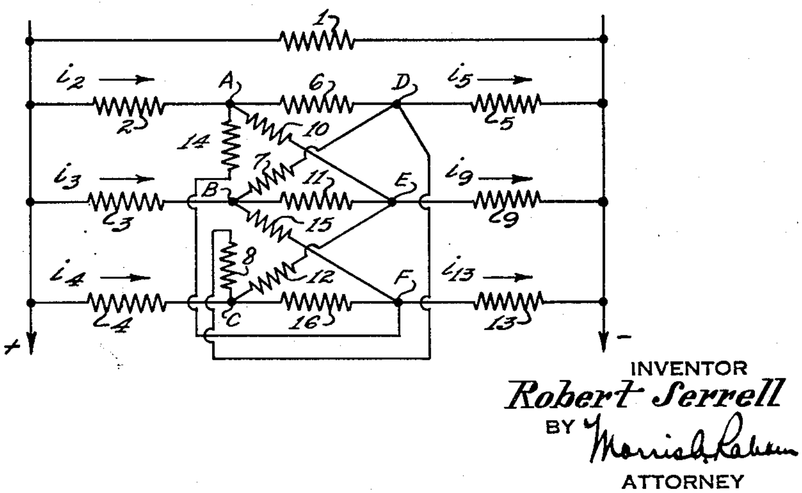
Figure 6:
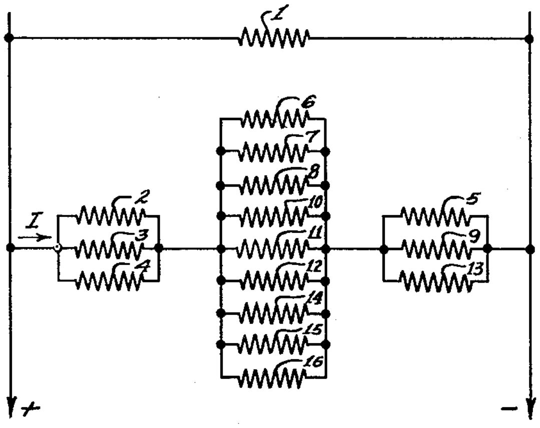
Figure 7:
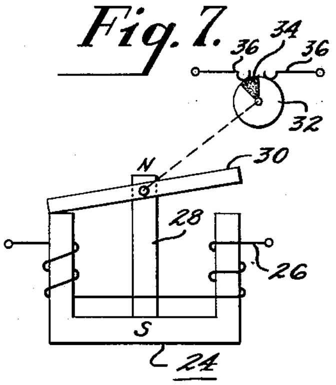
Figure 8:
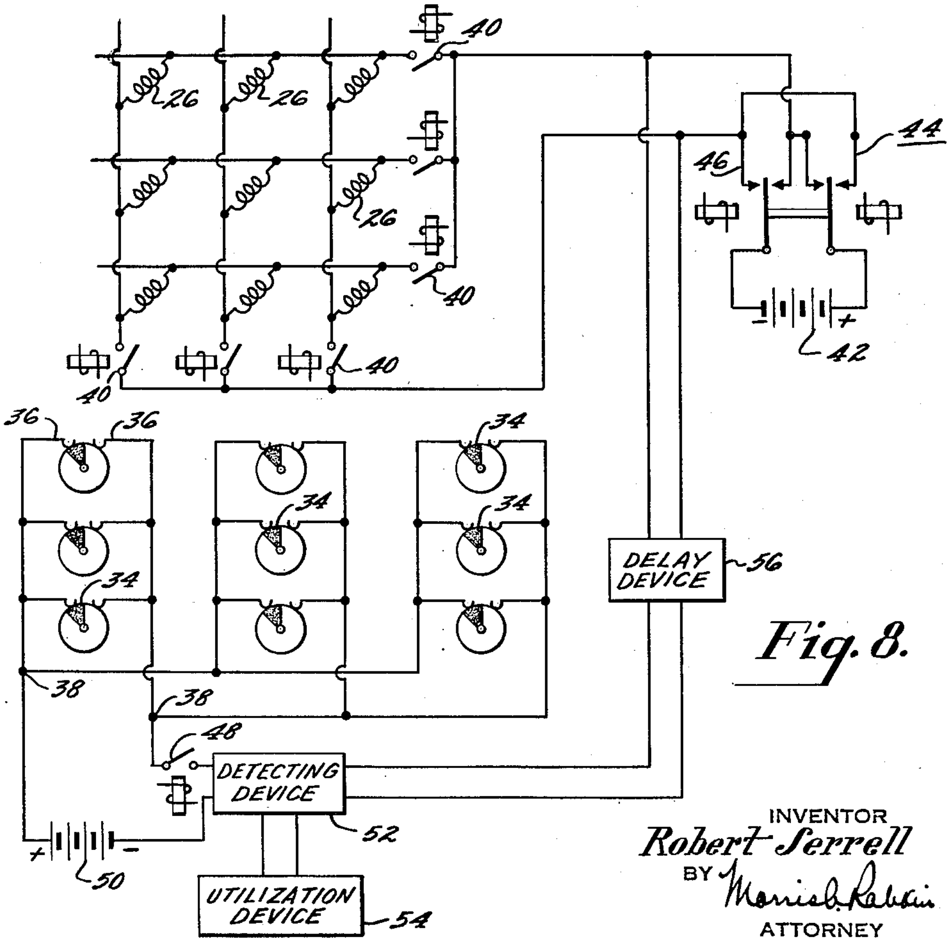

The novel features of the invention as well as the invention itself, both as to its organization and method of operation will best be understood from the following description when read in connection with the accompanying drawings, in which Figures 1 through 6 are circuit diagrams of configurations of resistor arrays which are shown for the purpose of explaining the selecting action of the combinatorial storage network which constitutes an embodiment of the invention, Figure 7 is a schematic diagram of a relay which is used in an embodiment of the invention, and Figure 8 shows a partial circuit and partial schematic diagram of an embodiment of the invention.

Referring now to Figure 1, there may be seen a square array of constant and identical resistors each one of which is connected between one of the horizontal conductors 20 and one of the vertical conductors 22. The angular position of these conductors is of no importance; they are merely shown as vertical and horizontal for convenience. The horizontal conductors 20 are hereafter referred to as the first set of selecting conductors and the vertical conductors 22 as the second set of selecting conductors. Each of the first set of selecting conductors has an equal number of resistors connected to it. Each of the resistors connected to one of the first set of selecting conductors is connected to a different one of the second set of selecting conductors. Each of the resistors, in the 3 x 3 array shown, has a reference number, 1 through 9, assigned to it.

Figure 2:
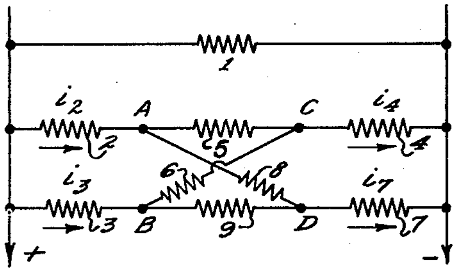
Figure 3:
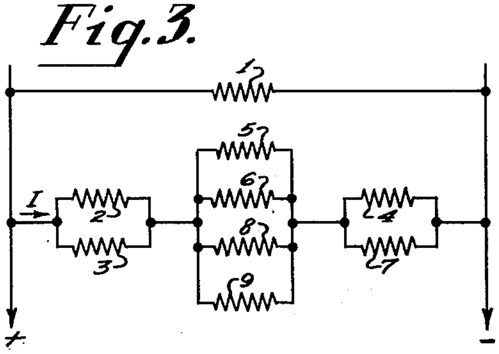

Assume an application of an exciting voltage, with a polarity as shown, to the lowermost first selecting conductor and the extreme left second selecting conductor. The network shown in Figure 1 may be represented as shown in Fig. 2. Resistor 1 receives the full applied voltage and the current through it is known. Considering the other resistors, it should be obvious that, because of the symmetry of the array, the currents through resistors 2 and 3 are equal, and the current through resistors 4 and 7 are equal or, $$i_2=i_3,\ i_4=i_7$$

Since all the resistors are identical, the potentials of the points A and B and of C and D (with respect to any given point of the network) are respectively identical. The points A and B and C and D can therefore be respectively connected together without altering any of the currents. The network can then be redrawn in the manner shown in Figure 3. If the applied voltage is assumed as one volt and the value of each resistor as one ohm, the current I, through the branch not including resistor 1, is:

$$I=\frac{1}{\frac{1}{2}+\frac{1}{4}+\frac{1}{2}}$$

Further:

$$i_2=i_3=i_4=i_7=\frac{I}{2}=\frac{1}{2}\left(\frac{1}{\frac{1}{2}+\frac{1}{4}+\frac{1}{2}}\right)=0.4\text{ ampere} \quad (1)$$

$$i_5=i_6=i_8=i_9=\frac{I}{4}=\frac{1}{4}\left(\frac{1}{\frac{1}{2}+\frac{1}{4}+\frac{1}{2}}\right)=0.2\text{ ampere} \quad (2)$$

Figure 4:
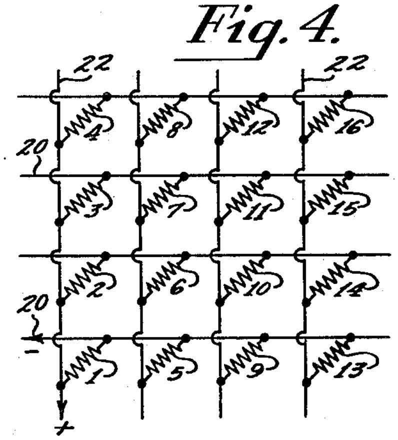

Now consider another example, one in which there are four horizontal and four vertical conductors. This sixteen-cell array is shown in Figure 4 and it is energized in the same manner as the 3 x 3 array shown in Figure 1.

This network may then be redrawn as shown in Figure 5. As before $i_1$ is known and from the symmetry of the configuration, $$i_2=i_3=i_4 \text{ and } i_5=i_9=i_{13}$$

It is therefore evident that A, B and C are at the same potential. Also D, E and F are at the same potential. These points can then be respectively connected together without changing any of the currents. The configuration shown in Fig. 5 can then be redrawn as is shown in Figure 6, and the current I, through the branch not including resistor 1, is:

$$I=\frac{1}{\frac{1}{3}+\frac{1}{9}+\frac{1}{3}}$$

with $$i_2=i_3=i_4=i_5=i_9=i_{13}=\frac{I}{3}=\frac{1}{3}\left(\frac{1}{\frac{1}{3}+\frac{1}{9}+\frac{1}{3}}\right)=0.428 \text{ amp.} \quad (3)$$

and $$i_6=i_7=i_8=i_{10}=i_{11}=i_{12}=i_{14}=i_{15}=i_{16}=\frac{I}{9}=\frac{1}{9}\left(\frac{1}{\frac{1}{3}+\frac{1}{9}+\frac{1}{3}}\right)=0.1428 \text{ amp.} \quad (4)$$

Now, generalizing these results, it is evident that with $i_1=1$, by definition, there are in $n \times n$ constant resistor arrays two characteristic currents through the resistors other than resistor 1. The first of these two currents, which shall be designated as $I_a$, flows through each of the resistors directly connected to one or the other of the two energized conductors. In Figure 5 these are the resistors 2, 3, 4, 5, 9 and 13.

$$I_a=\left(\frac{1}{n-1}\right)\left(\frac{1}{\frac{1}{n-1}+\frac{1}{(n-1)^2}+\frac{1}{n-1}}\right)=\frac{n-1}{2(n-1)+1} \quad (5)$$

This can be deduced from Equations 1 and 3.

The second current, which shall be designated by $I_b$, flows through each resistor that is not directly connected to an energized conductor, such as resistors 6, 7, 8, 10, 11, 12, 14, 15, 16 shown in Figure 5.

$$I_b=\frac{I_a}{n-1}=\frac{1}{(n-1)^2}\left(\frac{1}{\frac{1}{n-1}+\frac{1}{(n-1)^2}+\frac{1}{n-1}}\right)=\frac{1}{2(n-1)+1} \quad (6)$$

This can be deduced from Equations 2 and 4. It is important to note that as $n$ is increased indefinitely, $I_a$ approaches ½ as a limit while $I_b$ approaches zero. It can further be concluded that the current through any resistor in the network other than the one selected, which is the one connected directly across the two excited selecting conductors, can never exceed half of the current through the selected resistor. It can be readily shown that the currents $I_a$ and $I_b$ are independent of the location of the excitation in any given square array. Excitation may be applied to selecting conductors other than the corner ones to select a desired resistor in the array and the current through the selected resistor is always more than twice that through any other resistor in the array.

If each of the resistors shown in Figure 5 is replaced by storage cells, an $n \times n$ combinatorial storage network of any capacity may be constructed from storage cells possessing the following characteristics:

(*a*) All the cells have the same impedance and this impedance is a constant independent of the current.

(*b*) Each cell passes from one of two stable states to the other when excitation of a given intensity and direction is applied to its terminals.

(*c*) No cell changes state in either direction when the intensity of the excitation applied is less than one-half the given intensity excitation mentioned in (*b*).

It should be further noted that a number $n^2$ of storage cells can be individually and unambiguously controlled by the excitation of two out of $2n$ selecting conductors.

Referring to Figure 7, there may be seen a schematic diagram of a two-position polarized relay 24 which possesses the properties listed under (*a*), (*b*) and (*c*) above, and is suitable for use with the combinatorial network to form a combinatorial storage network. The relay has a two-terminal coil winding 26 and is polarized by a permanent magnet 28 so that the polarity of excitation must be reversed to cause the armature 30 of the relay 24 to move from one stable position to the next. The relay remains in the position corresponding to the polarity of its excitation after the excitation is removed. Furthermore, the relay is so adjusted that no action takes place (in either direction) where the excitation voltage (at the coil terminals) is not more than one-half the normal value of the excitation applied to the selecting conductors. A commutator 32 is arranged to rotate integrally with the armature 30 of the relay 24. As the relay changes position a conducting portion 34 on the commutator 32 momentarily connects the relay contacts 36. These relay contacts 36 are not connected together when the relay is in either of its two stable positions, but are connected together for a short time while the relay position is being changed.

Referring now to Figure 8, there may be seen a schematic drawing of an embodiment of the invention. A 3 x 3 array is shown. The coils 26 of the relays 24 are shown connected between the first and second sets of selecting conductors. All the like relay contacts 36 are connected together and brought out to two connectors 38. Single pole relays 40 are shown which may be selectively closed to apply excitation to a desired one of the first set and a desired one of the second set of selecting conductors to selectively excite a desired one of the relays. Excitation from a battery source 42 is applied through a double pole-neutral position double throw relay 44. The double pole-double throw relay contacts 46 are cross-connected so that the polarity of the voltage which is obtained from the battery source 42 may be reversed as desired. The cross-connected relay contacts 46 are connected to the selecting relays 40. In operation, the two selecting relays 40 which select a desired relay coil 26 are operated and then the double pole double throw relay 44 is operated to apply a voltage of a desired polarity to the selected relay 24. If the values one and zero or plus and minus are respectively assigned to the first and second conditions of stability of the relay 24, which conditions are respectively attained by the application of one or the other polarity of the exciting voltage, the relay 24 may then serve as the storage device.

The connectors 38 to which the relay contacts 36 are connected are connected to the normally open contacts of a single pole relay 48 and to a battery power source. A detecting device 52 which may be a biased-off amplifier stage is connected to the relay 48 contact and to the battery source 50. The detecting device 52 has its output coupled to a utilization device 54 and to a delay device 56. The delay device 56 is connected to the input to the selecting relays 40.

Writing into the combinatorial storage network is performed as has been indicated above. Two selecting relays 40 are operated and then the double-pole double-throw relay 44 is operated to apply a voltage of a desired polarity to the selected storage relay 24. To write new information into the storage network the exciting voltages with the polarities corresponding to the digits desired to be stored are applied to the desired storage relays 24. No erasure before applying new information is necessary. The new information is written into the network over the old information.

Reading from the network is simply accomplished. The selecting relays 40 which select the storage relay desired to be read are operated. Then the relay 48 which connects the detecting device to the storage relay contacts is operated. Next the double-pole double-throw relay 44 is operated. For reading only a predetermined polarity voltage is applied. The condition or the information stored in the selected storage relay is then readily determined by the presence or absence of an output from the detecting device 52. If the storage relay 24 is already in the condition to which the one polarity reading exciting voltage would have driven it, the exciting voltage has no effect on the storage relay 24. If it is in the other condition, the reading voltage operates the storage relay and its contacts are momentarily connected. This is detected by the detecting device 52 which then supplies an output to the utilization device 54 for utilization as desired. Output is also supplied to the delay device 56 which delays it long enough for the double pole-double throw relay to return to its neutral position, whereupon the delay device applies its output through the selecting relays 40 to the selected storage relay 24 to restore it to the condition which it had before the application of the reading voltage. If desired, the delay device may be eliminated and the output from the detecting device may be applied to the double pole double throw relay 44 to operate it to apply a voltage of opposite polarity from the reading voltage when an output from the storage relay being read is detected by the detecting device.

While the combinatorial storage network, shown in Figure 8 and described above, shows relays or electromagnetic devices utilized as storage elements and selecting elements, substitutes or alternatives therefor will readily suggest themselves to those well skilled in the art. The relays are shown in the network for illustrative and explanatory purposes and are not to be construed as exemplifying the sole embodiment of the invention herein. The use of electron tubes as switching devices or electronic relays is well understood.

Magnetic materials may also be used as the memory element. Each of a number of coils, within which the magnetic material is inserted, may be connected in place of each of the storage relay coils. The number of turns in each coil is determined so that sufficient electromagnetic force is applied to overcome the magnetic material coercive force and drive it to positive or negative saturation, only where the selected coil current exceeds the maximum unselected coil current by more than one-half. Reading may be done by having a small pickup coil around each magnetic element, and applying a constant polarity exciting potential to the proper selecting conductors. If all the reading pickup coils are connected in parallel and their output is applied to an ampltiude discriminator, if the selected magnetic material, whose condition is being read, is in condition not to be driven to opposite polarity saturation by the reading pulse, the voltage induced in the pickup coil is below the amplitude required to pass the amplitude discriminator. If the magnetic material being read is in condition to be driven to opposite polarity saturation by the reading pulse, the voltage induced in the pickup coil, in view of the extra flux changes, will exceed the amplitude required to pass the amplitude discriminator. Thus the condition of the storage element may be read.

From the foregoing description, it will be readily apparent that there has been provided an improved combinatorial storage network which is simple and easily controlled, has fewer access leads than storage elements and requires no holding power. Further, the network may be expanded to include as large a number of storage elements as required. The embodiment of the invention shown also lends itself to parallel control of many such networks simultaneously or other desired combinations or groups of said networks. It should be apparent that many variations may be utilized in the particular embodiment herein disclosed, and that many other embodiments are possible, all within the spirit and scope of the invention. It is therefore desired that the foregoing shall be taken as illustrative and not as limiting.

What is claimed is:

1. A combinatorial storage network comprising, in combination, a first and a second set of selecting conductors, means to apply an exciting current to a desired one of said first set and second set of said selecting conductors, means to reverse the polarity of said exciting current, a plurality of groups of relays, each of said relays having a coil winding with at least two terminals and requiring an application thereto of a current in excess of half said exciting current to be made to operate, each of said relays being of the type having two stable positions and being operated from one position to the other by the application of currents of opposite polarity, each of said relays having a first and a second contact and means to connect said first and second contacts together while said relay is being operated from one stable position to the other, each of said groups of relays having one of said coil terminals connected to respective ones of said first set of selecting conductors, each one of the relays in each of said groups having the other of its coil terminals connected to a different one of said second set of selecting conductors, a pair of connectors, means connecting all the first contacts of all of said relays to one of said connectors and all the second contacts of all of said relays to the other of said connectors, and means coupled to said connectors to detect a connection between any of said relay first and second contacts.

2. A combinatorial storage network comprising, in combination, a first and a second set of selecting conductors, means to apply an exciting current to a desired one of said first set and second set of said selecting conductors, means to reverse the polarity of said exciting current, a plurality of groups of relays, each of said relays having a coil winding with at least two terminals and requiring an application thereto of a current in excess of half said exciting current to be made to operate, each of said relays being of the type having two stable positions and being operated from one position to the other by the application of currents of opposite polarity, each of said relays having a first and a second contact and means to connect said first and second contacts together while said relay is being operated from one stable position to the other, each of said groups of relays having one of said coil terminals connected to respective ones of said first set of selecting conductors, each one of the relays in each of said groups having the other of its coil terminals connected to a different one of said second set of selecting conductors, a pair of connectors, means connecting all the first contacts of all of said relays to one of said connectors and all the second contacts of all of said relays to the other of said connectors, means coupled to said connectors to detect a connection between any of said relay first and second contacts when one of said relays is operated from a particular one to the other of said two stable positions, and means connected to said detecting means and responsive thereto to restore said one relay to said particular one stable position.

3. A combinatorial storage network as recited in claim 2 wherein said means to restore said one relay to said particular one stable position includes means for applying currents to said first and second sets of selecting conductors.

References Cited in the file of this patent

UNITED STATES PATENTS

| Number | Name | Date |
|---|---|---|
| 843,746 | Hall | Feb. 12, 1907 |
| 2,244,700 | Horton | June 10, 1941 |
| 2,308,778 | Prince | Jan. 19, 1943 |
| 2,542,672 | Hecht | Feb. 20, 1951 |
| 2,562,100 | Holden | July 24, 1951 |

OTHER REFERENCES

Electronic Computing Circuit of the Eniac," by Arthur W. Burks (from Proceedings of the I. R. E. for 1947, pages 756–767).

High Speed Computing Devices, by Engineering Research Associates, Inc., copyright 1950, McGraw-Hill Book Co., Inc.